United States Patent

[11] 3,563,569

[72] Inventor Roy Calvin Wilson,
947 Grant Line Road, Santa Paula, Calif. 93060
[21] Appl. No. 787,132
[22] Filed Dec. 26, 1968
[45] Patented Feb. 16, 1971

[54] DUAL CONNECTION TUBULAR FITTING
1 Claim, 3 Drawing Figs.
[52] U.S. Cl. .................................................. 285/5, 285/174, 285/423
[51] Int. Cl. ...................................................... F16l 19/02, F16l 47/00
[50] Field of Search ....................................... 285/174, (S.F. Digest), (M Digest), 423, 238, 284 (Cursory), 260, 386, 387, 388, 354 (Cursory), 5, 66, 423

[56] References Cited
UNITED STATES PATENTS
| | | | |
|---|---|---|---|
| 2,933,428 | 4/1960 | Meuller.......................... | 285/423X |
| 3,108,826 | 10/1963 | Black............................. | 285/174 |
| 3,219,367 | 11/1965 | Franck........................ | 285/S.F.(Digest) |

FOREIGN PATENTS
| | | | |
|---|---|---|---|
| 562,012 | 8/1958 | Canada....................... | 285/423 |

Primary Examiner—Thomas F. Callaghan
Attorney—Elliott & Pastoriza

ABSTRACT: A tubular fitting includes one end arranged for permanent connection with an insertable hose and another end arranged for detachable connection with a detachable hose. The detachable hose includes an internally threaded swivel collar that can be quickly and easily screwed onto an unthreaded from the tubular fitting.

PATENTED FEB 16 1971

3,563,569

INVENTOR:
ROY CALVIN WILSON JR.
BY
Elliott & Pastoriza
ATTORNEYS

DUAL CONNECTION TUBULAR FITTING

The present invention relates to a tubular fitting and more specifically to a tubular fitting capable of being permanently connected at one end to a hose and detachably connected at its other end to a detachable hose fitting.

BACKGROUND OF THE INVENTION

It often is important such as in the agricultural business for example to be able to supply fluid, such as water for irrigation purposes, to the hoses linked to multiple fluid distribution systems. In order to permit a supply hose or nozzle associated with a single fluid supply source to be detachably coupled to the hoses, or valves they must ordinarily be held together by tightly crimped brass bands, plastic serrated collars or the like.

The assemblage time is time consuming and the resulting detachable coupling is frequently leakage prone.

BRIEF SUMMARY OF THE INVENTION

Briefly stated, the present invention contemplates a dual connection tubular fitting arranged and shaped for permanent connection at one end to a hose and detachable connection at its other end to a detachable hose. The tubular fitting is characterized by a plastic tubular body having a smooth bore formed on the interior surface of one end shaped for being permanently adhesively connected with the external periphery of an insertable hose. A stop ring is formed on the body interior periphery adjacent an inner portion of the smooth bore for limiting inward movement of the hose. The other end of the tubular fitting includes threads for being interengaged with mating threads of a detachable hose.

The detachable hose is preferably characterized by a tubular-shaped swivel collar component and a tubular-shaped insert component. Internal threads of the swivel collar are dimensioned to interengage with the above mentioned external threads of the tubular body. A radially inwardly extending lip is formed on the swivel collar.

The insert includes a snapring and a tandem ring that define therebetween an annular recess. The snapring has a tapered wall to facilitate its being inserted with a wedging action into and under the swivel collar lip. When the snapring and lip are snap fitted together, relative axial movement between the swivel collar and insert is prevented.

BRIEF DESCRIPTION OF THE DRAWINGS

The numerous benefits and unique aspects of the present invention will be fully understood when the following detailed description is studied in conjunction with the drawings in which.

DETAILED DESCRIPTION OF THE PREFERRED EMBODIMENT

Figure 1:
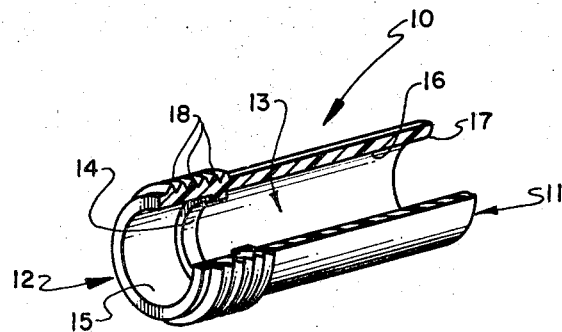
FIG. 1 is a perspective sectional view, showing the important features of the dual connection tubular fitting.

Referring now to FIG. 1, a tubular fitting 10 is disclosed that is constructed from a suitable durable plastic for conducting fluids. One end 11 of fitting 10 is sized and shaped for being permanently secured to a stationary hose (not shown). Opposite end 12 is shaped and sized for being temporarily and detachably connected to a detachable hose (not shown).

Formed on interior periphery 13 of fitting 10 is a stop ring 14 located closer to the edge of end 12 than the edge of end 11. Stop ring 14 divides interior periphery 13 into two annular zones 15 and 16. Zone 16 is a smooth bore that is shaped and sized for being adhesively secured to the external periphery of an insertable hose. Any conventional adhesive or cement for bonding or fusing plastic material together may be employed. Stop ring 14 is positioned to limit the travel of the hose as it is being inserted.

The extreme edge of end 11 is formed with a curved shoulder 17 for facilitating the insertion of the rigid hose. The inner diameter of annular zone 15 is substantially equivalent with that of annular zone 16 in order to save material and make the overall tubular fitting 10 more lightweight.

A plurality of threads 18 are formed on the exterior periphery of end 12 for being interengaged with the threads of a detachable hose. The outer diameter of threads 18 exceeds the outer diameter of the other portions of tubular fitting 10.

Figure 2:
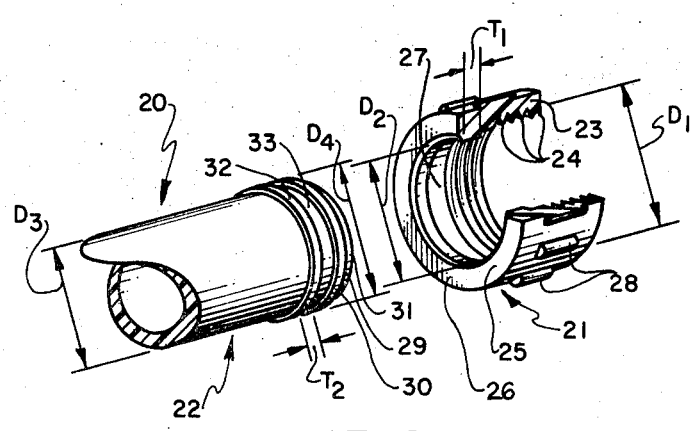
FIG. 2 is an exploded, partially sectional view, showing the swivel collar and insert components of the snap-on hose coupling; and, FIG. 3 is a perspective view showing the dual connection tubular fitting and snap-on hose coupling partially assembled together and the dual connection tubular fitting permanently adhered to a hose.

Referring now to FIG. 2, a plastic snap-on hose coupling 20 is illustrated constructed for detachable connection with the dual connection tubular fitting described in conjunction with FIG. 1. Hose coupling 20 includes a swivel collar 21 of general tubular shape and a tubular shaped insert 22. Swivel collar 21 includes an end 23 formed internally with threads 24 characterized by a crest or inner diameter $D_1$. The other end 25 of swivel collar 21 is formed with a radially inwardly extending lip 26 characterized by a diameter $D_2$ smaller than thread diameter $D_1$. Lip 26 has a longitudinal thickness $t_1$. A smooth unthreaded zone 27 is disposed between threads 24 and lip 26.

The external periphery of swivel collar 21 includes a series of spaced ribs 28 intended to be gripped by a person for use in rotating or swiveling collar 21.

Tubular shaped insert 22 is characterized by an external diameter $D_3$ slightly smaller than or equivalent to lip diameter $D_2$. One end 29 nearest swivel collar 21 forms a snapring 30 having a tapered or converging wall 31. Snapring diameter $D_4$ exceeds lip diameter $D_2$ and is slightly less than the inner diameter of smooth unthreaded zone 27.

A tandem ring 32 is arranged on insert 22 behind snapring 30. Snapring 30 and tandem ring 32 form therebetween an annular recess 33 having a longitudinal length or thickness $t_2$ slightly greater than lip thickness $t_1$.

In order to couple swivel collar 21 and insert 22 together, the two components are aligned as shown and then snapring 30 is thrust, by a hammer tap for example, into and under lip 26 until lip snaps into recess 33. Relative axial movement between swivel collar 21 and insert 22 is prevented when snapring 30 and lip 26 are thus snap-fitted together. Tapered wall 31 permits snapring 30 to be wedged inwardly through the opening defined by lip 26. When swivel collar 21 and insert 22 are thus securely coupled together, a person may easily swivel collar 21 by gripping ribs 28 and exerting a twisting movement.

Figure 3:
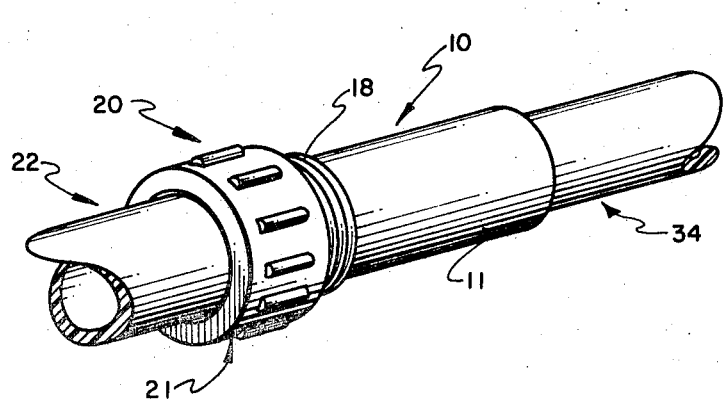

FIG. 3 shows dual connection tubular fitting 10 partially threaded into snap-on hose coupling 20. The other end 11 of tubular fitting 10 is shown permanently secured by a suitable adhesive to a stationary hose 34. Hose 34 represents, for example, an inlet hose for an orchard irrigation system or the outlet or faucet of a reservoir for replenishing recreational vehicle water supplies.

OPERATION

Keeping the above construction in mind, it can be understood how the previously described disadvantages of prior art hose couplings are overcome or substantially eliminated by the present invention.

In order to benefit from the advantages of the present invention, a person initially spreads adhesive over the end of hose 34 and then slips plastic tubular fitting 10 over rigid hose 34 and waits until they are permanently connected together.

In order to detachably connect plastic snap-on hose coupling 20 to tubular fitting 10, swivel collar 20 is easily screwed onto threads 18 of tubular fitting 10. After fluid has been supplied to its destination, tubular fitting 10 and hose coupling 20 can be quickly and easily disconnected by twisting swivel collar 21 in a reverse direction.

From the foregoing it will be evident that the present invention has provided a dual connection tubular fitting in which all of the various advantages are fully realized.

I claim:
1. A detachable conduit coupling comprising:
a. a tubular fitting including a plastic tubular body having a first end and a second end;
b. a smooth bore formed on the interior surface of the first end permanently adhesively connected with an insertable hose;
c. a stop ring formed on the body interior periphery adjacent an inner portion of the smooth bore, the stop ring being arranged to limit inward movement of the hose;
d. a curved shoulder formed on an entrance portion of the first end to facilitate insertion of the hose;
e. threads formed on the external surface of the second end having an outer diameter exceeding that of the tubular body;
f. a plastic snap-on hose coupling including a tubular-shaped swivel collar and a tubular-shaped insert;
g. internal threads extending inwardly from one end of the swivel collar interengaged with said external threads of said tubular body second end;
h. a radially inwardly extending lip formed on the other swivel collar end;
i. a snapring formed on one end of the insert having an outer diameter larger than the inner diameter of the swivel collar lip so that the snapring can be snap fitted into the lip, the snapring being formed with a tapered wall to facilitate its insertion with a wedging action into the lip;
j. a tandem ring axially spaced on the insert from the snapring to define therewith an annular recess shaped to captivate the lip, the recess being shaped to stop relative axial movement between the swivel collar and insert as the swivel collar is being coupled to or uncoupled from the tubular body; and
k. plural ribs on the external surface of the swivel collar that may be gripped by a person to rotate the collar relative to the insert.